United States Patent
Choi et al.

(10) Patent No.: US 8,171,378 B2
(45) Date of Patent: May 1, 2012

(54) FLASH MEMORY SYSTEM HAVING ENCRYPTED ERROR CORRECTION CODE AND ENCRYPTION METHOD FOR FLASH MEMORY SYSTEM

(75) Inventors: Sung-Up Choi, Hwaseong-si (KR); Yun-Tae Lee, Seoul (KR); Sung-Man Hwang, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 937 days.

(21) Appl. No.: 12/187,427

(22) Filed: Aug. 7, 2008

(65) Prior Publication Data
US 2009/0044077 A1    Feb. 12, 2009

(30) Foreign Application Priority Data
Aug. 7, 2007 (KR) .................. 10-2007-0079103

(51) Int. Cl.
*G06F 11/00* (2006.01)
(52) U.S. Cl. .................. 714/764; 714/758; 714/6.24
(58) Field of Classification Search .................. None
See application file for complete search history.

(56) References Cited

U.S. PATENT DOCUMENTS

| | | | | |
|---|---|---|---|---|
| 6,252,961 | B1* | 6/2001 | Hogan | 380/37 |
| 7,246,299 | B2* | 7/2007 | Saito | 714/756 |
| 7,346,834 | B2* | 3/2008 | Weng | 714/782 |
| 7,937,639 | B2* | 5/2011 | Sonnekalb | 714/752 |
| 8,015,440 | B2* | 9/2011 | Flynn et al. | 714/6.24 |
| 2004/0139380 | A1* | 7/2004 | Sako | 714/758 |
| 2004/0139381 | A1* | 7/2004 | Inokuchi et al. | 714/758 |
| 2005/0005149 | A1* | 1/2005 | Hirota et al. | 713/193 |
| 2005/0120265 | A1 | 6/2005 | Pline et al. | |
| 2005/0149819 | A1* | 7/2005 | Hwang | 714/758 |
| 2006/0294397 | A1 | 12/2006 | Baker | |
| 2007/0294609 | A1* | 12/2007 | Inokuchi et al. | 714/769 |
| 2008/0141043 | A1* | 6/2008 | Flynn et al. | 713/193 |
| 2010/0293440 | A1* | 11/2010 | Thatcher et al. | 714/764 |
| 2011/0010604 | A1* | 1/2011 | Hwang et al. | 714/755 |
| 2011/0041039 | A1* | 2/2011 | Harari et al. | 714/773 |

FOREIGN PATENT DOCUMENTS
KR    1020070037285    4/2007

\* cited by examiner

*Primary Examiner* — Christopher McCarthy
(74) *Attorney, Agent, or Firm* — F. Chau & Associates, LLC

(57) ABSTRACT

A flash memory system includes a flash memory for storing input data, and a memory controller controlling the flash memory, wherein the memory controller generates a first error correction code corresponding to the input data, and encrypts the first error correction code, and the flash memory includes a main area for storing the input data and a spare area for storing the encrypted first error correction code.

13 Claims, 4 Drawing Sheets

FLASH MEMORY SYSTEM HAVING ENCRYPTED ERROR CORRECTION CODE AND ENCRYPTION METHOD FOR FLASH MEMORY SYSTEM

CROSS-REFERENCE TO RELATED APPLICATION

This application claims priority under 35 U.S.C. §119 to Korean Patent Application No. 10-2007-0079103, filed on Aug. 7, 2007, the disclosure of which is incorporated by reference herein.

BACKGROUND OF THE INVENTION

The present disclosure relates to a flash memory system, and more particularly, to an encryption method for a flash memory system including a memory cell array for storing multi-bit data.

A memory cell array of flash memories includes a main area for storing the data and a spare area. The spare area stores an error correction code (ECC) corresponding to the data, and a flash translation layer (FTL). By way of example, when one page of a main area of a flash memory is 512 bytes in size, a spare area is 16 bytes in size.

The FTL translates a logical address generated by a file system during a write operation into a physical address of a corresponding sector wherein an erase operation has been performed.

Error detection and correction techniques effectively restore data errors caused by various factors. For example, data errors may be introduced by various factors during a process of storing data in a memory, and may also be introduced because of distortions of a data transmission channel during transmission of data from a source to a destination.

Various methods for detecting and correcting data errors have been proposed. For example, a Reed-Solomon (RS) code, a Hamming code, a Bose-Chaudhuri-Hocquenghem (BCH) code, and a cyclic redundancy code (CRC) are well known methods for detecting and correcting data errors.

For example, CRC codes may be used to detect data errors and Reed-Solomon codes to correct data errors.

Data is usually stored in the flash memory device together with ECC data. The ECC data is used to correct an error in a read operation of the flash memory device. The number of errors that can be corrected using the ECC data is limited. A bit error in the read operation of the flash memory device can be corrected using the aforementioned error detection and correction techniques, without an additional operation such as a block replacement operation.

In a flash memory having an array of memory cells for storing multi-bit data, a bit error is contained in data due to the intrinsic characteristics of a multi-level cell (MLC). Thus, the flash memory includes a spare area used to store an ECC to correct the bit error. When a bit error occurs, the flash memory system ia able to correct the bit error based on the ECC.

A typical flash memory system encrypts data in the main area to protect the main area from hacking attacks. Also, the flash memory system stores an ECC, corresponding to the encrypted data of the main area, in the spare area.

SUMMARY OF THE INVENTION

Exemplary embodiments of the present invention seek to provide a flash memory system for efficiently encrypting data of a flash memory, and an encryption method for a flash memory system.

A flash memory system, according to an exemplary embodiment of the present invention, includes a flash memory; and a memory controller controlling the flash memory, wherein the memory controller generates a first error correction code corresponding to the input data, and encrypts the first error correction code, and the flash memory includes a main area for storing the input data and a spare area for storing the encrypted first error correction code.

The memory controller may generate a second error correction code corresponding to the encrypted first error correction code.

The second error correction code may be stored in the spare area.

The memory controller may include an encryption and decryption unit encrypting the first error correction code and decrypting the encrypted first error correction code; and an error correction code generation unit generating the first error correction code and the second error correction code.

The memory controller may encrypt the first error correction code using an externally transmitted key.

The encrypted first error correction code, the second error correction code, and a flash translation layer may be stored in the spare area.

An encryption method of a flash memory system including a flash memory for storing input data and including a main area and a spare area, the encryption method includes generating a first error correction code corresponding to input data; encrypting the first error correction code; and storing the input data in the main area of the flash memory, and storing the encrypted first error correction code in the spare area of the flash memory.

The encryption method may further include generating a second error correction code corresponding to the encrypted first error correction code.

The input data may be transmitted from an external host.

The encrypted first error correction code may be generated using an externally transmitted key.

The encryption method may further include reading the input data, the encrypted first error correction code, and the second error correction code; detecting an error in the encrypted first error correction code based on the second error correction code; correcting the encrypted first error correction code if an error is detected in the encrypted first error correction code; decoding the second error correction code; decrypting the encrypted first error correction code; detecting an error in the input data based on the decrypted first error correction code; decoding the decrypted first error correction code if an error is detected in the input data; and correcting the error in the input data based on the first error correction code.

BRIEF DESCRIPTION OF THE DRAWINGS

Exemplary embodiments of the present invention will become apparent by reference to the following detailed description taken in conjunction with the attached drawings, wherein.

DETAILED DESCRIPTION OF EXEMPLARY EMBODIMENTS

Figure 1:
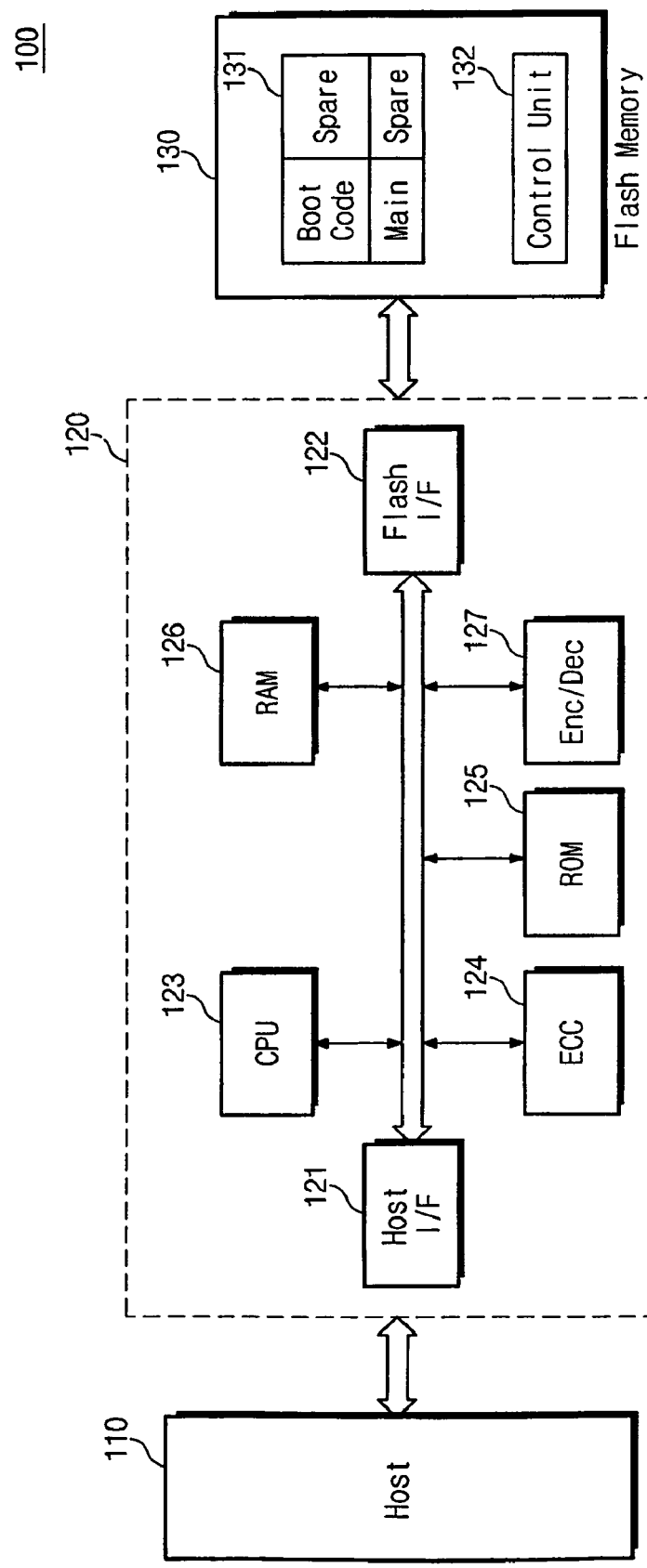
FIG. 1 is a block diagram of a memory system according to an exemplary embodiment of the present invention.

Hereinafter, exemplary embodiments of the present invention will be described in detail with reference to the accompanying drawings. Like reference numerals refer to like elements throughout.

A flash memory array having multi-level cells includes a main area for storing data and a spare area for storing an error correction code (ECC) for the data.

A flash memory system according to an exemplary embodiment of the present invention encrypts data in the spare area of the flash memory. In particular, the ECC for the data of the main area is encrypted in the spare area.

Accordingly, to extract the data stored in the flash memory, a hacker needs to obtain the data including bit errors and the encrypted ECC, and further needs to decrypt the encrypted ECC.

The flash memory system of the present invention encrypts a portion (i.e., the ECC) of the data in the spare area, thereby improving the performance of the flash memory system and reducing overhead of hardware and software used for encryption/decryption of the flash memory system.

FIG. 1 is a block diagram illustrating a memory system 100 according to an exemplary embodiment of the present invention.

Referring to FIG. 1, the memory system 100 includes a host 110, a memory controller 120, and a flash memory 130.

The memory controller 120 and the flash memory 130 may be housed in a single portable storage device including a universal serial bus (USB) memory and a memory card (e.g., a multi-media card (MMC), a secure digital (SD) card, an xD card, a compact flash (CF) card, or a subscriber identity module (SIM) card). These portable storage devices are used in computers, notebooks, digital cameras, cellular phones, MP3 players, portable multimedia players (PMPs), and game consoles, for example.

A main area of cell array 131 of the flash memory 130 having multi-level cells includes a plurality of bit errors. Accordingly, hackers cannot extract error-free data only by hacking the main area of the cell array 131.

The memory controller 120 includes a host interface 121, a flash interface 122, a central processing unit (CPU) 123, an ECC circuit 124, a ROM 125, a RAM 126, and an encrypt/decrypt (Enc/Dec) circuit 127.

The host interface 121 is configured to interface with the host 110 and the flash interface 122 is configured to interface with the flash memory 130. The CPU 123 is configured to control a read or write operation of the flash memory 130 in response to a request from the host 110.

The ECC circuit 124, using data to be transmitted and stored in the flash memory 130, generates a first ECC corresponding to data to be stored in the main area, and then encrypts the first ECC. Then, the ECC circuit 124 generates a second ECC corresponding to the encrypted first ECC. The encrypted first ECC and the second ECC are stored in the spare area of the cell array 131 of the flash memory 130.

Further, the ECC circuit 124 detects an error in data read from the flash memory 130. If the detected error is within a correction range, the ECC circuit 124 corrects the detected error. The ECC circuit 124 may be disposed in the flash memory 130 or in the memory controller 120, depending on the memory system 100.

The ROM 125 is used to store an operating system (OS) for loading a boot code from the flash memory 130, and the RAM 126 is used as a buffer memory. The RAM 126 is used to temporarily store data read from the flash memory 130 or data provided from the host 110. The RAM 126 may be embodied as a DRAM or an SRAM.

The RAM 126 may further be used to temporarily store table information for controlling read error information. The table information is stored as meta data in a meta area (not shown) of the flash memory 130 under the control of the CPU 123. The table information is copied from the meta area of the flash memory 130 to the RAM 126 when power is on.

The Enc/Dec circuit 127 encrypts or decrypts the first ECC.

The Enc/Dec circuit 127 may encrypt the first error correction code using an externally transmitted key.

The flash memory 130 includes the cell array 131 and a control unit 132. The cell array 131 includes a main area for storing the boot code, a spare area corresponding to the main area for storing the boot code, a main area for storing data transmitted from the host 110, and a spare area corresponding to the main area for storing the data transmitted from the host 110. The control unit 132, includes a row decoder, a column decoder, a page buffer, a bit line selection circuit, and a data buffer.

The memory system 100 loads the boot code including a bit error of the flash memory 130 and the data of the spare area corresponding to the boot code in the RAM 126 under the control of the CPU 123 when power is on.

The boot code, the encrypted first ECC corresponding to the boot code, the second ECC corresponding to the encrypted first ECC, and a flash translation layer (FTL) are stored in the RAM 126.

Thus, even when the boot code loaded in the RAM 126 is hacked, the complete boot code cannot be obtained since the boot code includes the bit error.

As described above, in the flash memory system according to an exemplary embodiment of the present invention, when power is on, the boot code including the bit error and the encrypted ECC is loaded in the RAM to prevent the boot code from being hacked, thereby increasing the security level of integrated circuit cards including the flash memory system.

Figure 2:
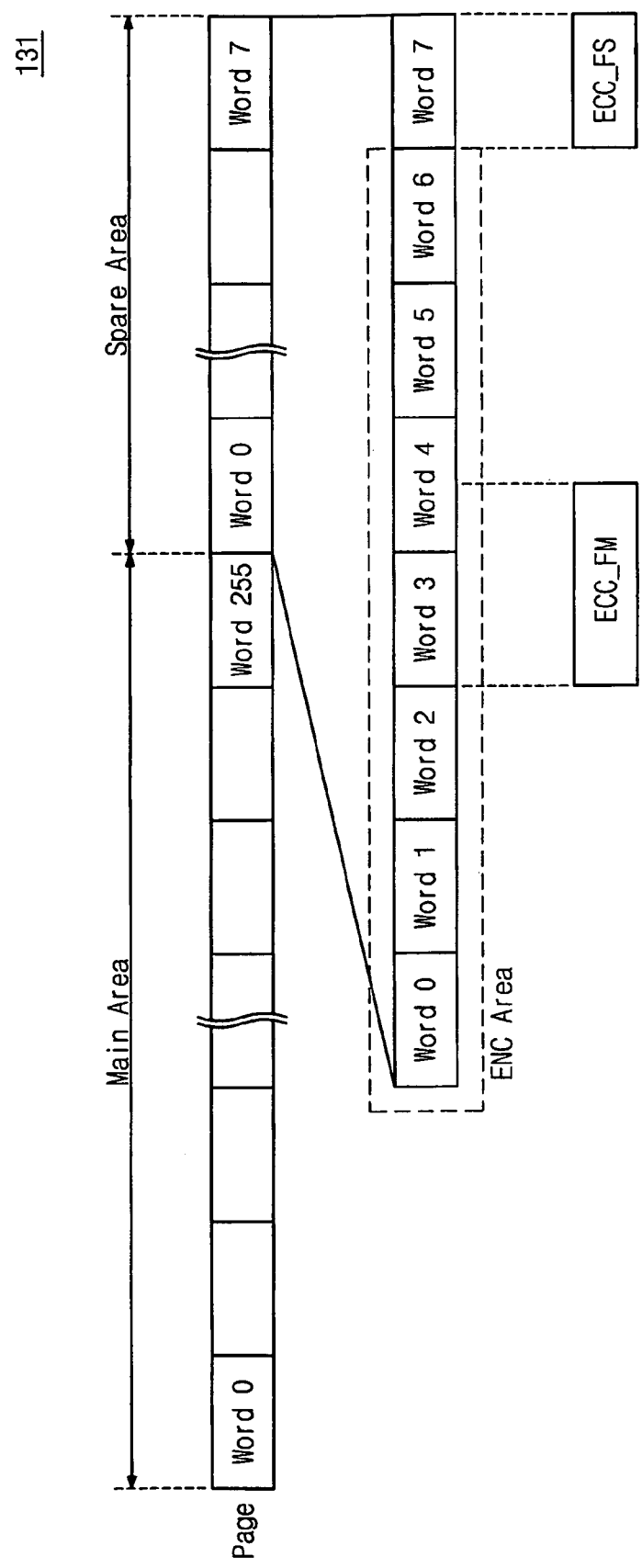
FIG. 2 is a block diagram illustrating a cell array of a flash memory of the memory system illustrated in FIG. 1.

FIG. 2 is a block diagram illustrating the cell array 131 of the flash memory 130 illustrated in FIG. 1.

Referring to FIGS. 1 and 2, the flash memory 130 includes a main area and a spare area in the cell array 131.

Referring to FIG. 2, a page includes a main area for storing data transmitted from a host and a spare area corresponding to the main area. The spare area is configured to store a first ECC ECC_FM, a second ECC ECC_FS, and a flash translation layer (FTL).

Although a single page of the cell array 131 of the flash memory 130 is illustrated in FIG. 2, a plurality of pages and a plurality of blocks including the plurality of pages are provided in the cell array 131 of the flash memory 130.

Referring to FIGS. 1 and 2, the main area of the flash memory 130 has 256 words, and the corresponding spare area of the flash memory 130 has 8 words. First through seventh words include the first ECC ECC_FM and the flash translation layer (FTL), and a eighth word in the spare area includes the second ECC ECC_FS corresponding to the first ECC ECC_FM.

Unlike a typical flash memory system that encrypts data in a main area, the flash memory system according to an exemplary embodiment of the present invention encrypts data stored in the first through seventh words of the spare area (ENC Area).

Therefore, the flash memory system according to an exemplary embodiment of the present invention encrypts a portion (i.e., the ECC) of the data in the spare area, thereby improving the performance of the flash memory system and reducing overhead of hardware and software used for encryption/decryption of the flash memory system.

Figure 3:
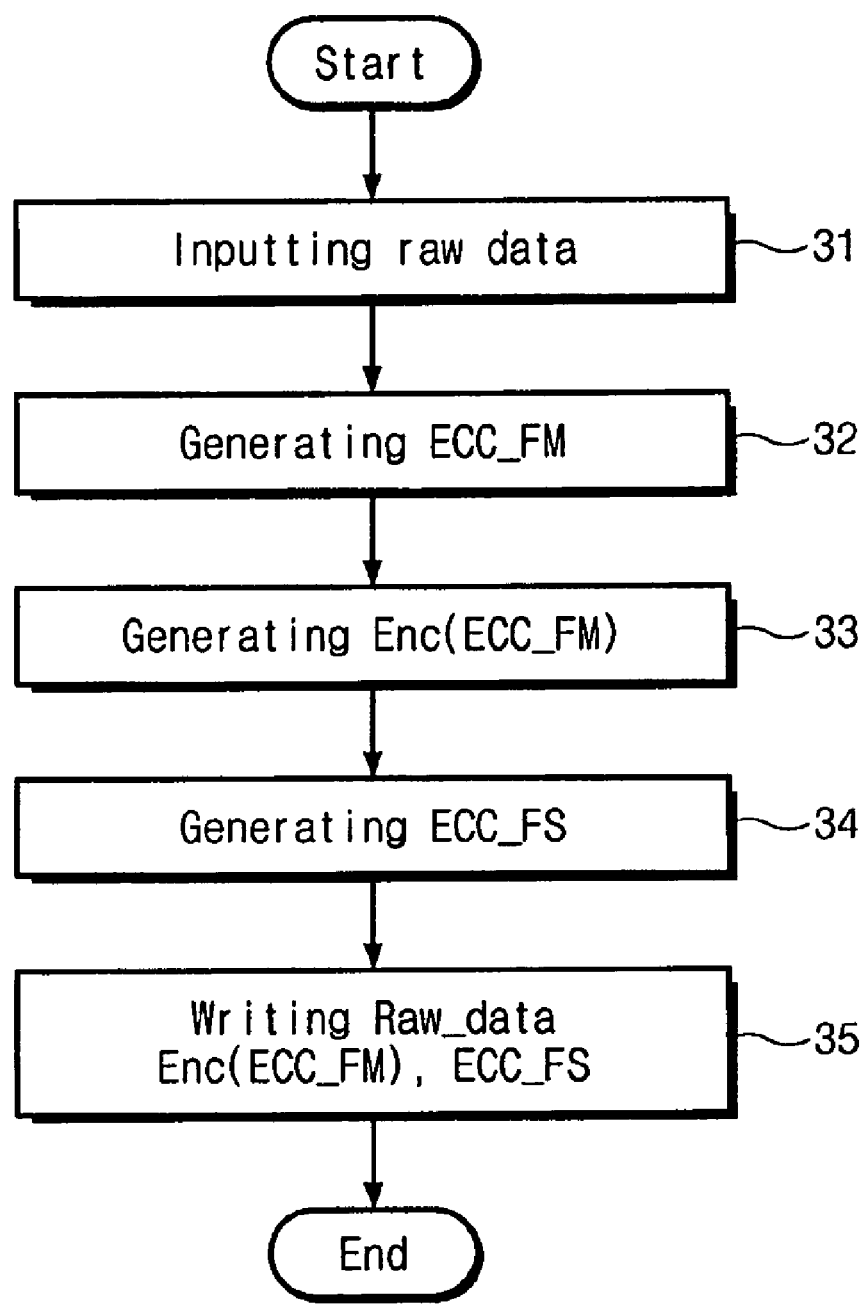
FIG. 3 is a flowchart illustrating an encryption method for a flash memory system according to an exemplary embodiment of the present invention.

FIG. 3 is a flowchart illustrating an encryption method of a flash memory system according to an exemplary embodiment of the present invention.

Referring to FIGS. 1 through 3, in step 31, the CPU 123 stores data transmitted from the host 110 in the RAM 126. In step 32, the ECC circuit 124 generates the first ECC ECC_FM corresponding to the data transmitted from the host 110. In step 33, the Enc/Dec circuit 127 encrypts Enc (ECC_FM) the generated first ECC ECC_FM. In step 34, the ECC circuit 124 generates the second ECC ECC_FS corresponding to the encrypted Enc (ECC_FM) first ECC ECC_FM. In step 35, the CPU 123 stores the data transmitted from the host 110, the encrypted Enc (ECC_FM) first ECC ECC_FM, and the second ECC ECC_FS in the flash memory 130.

Figure 4:
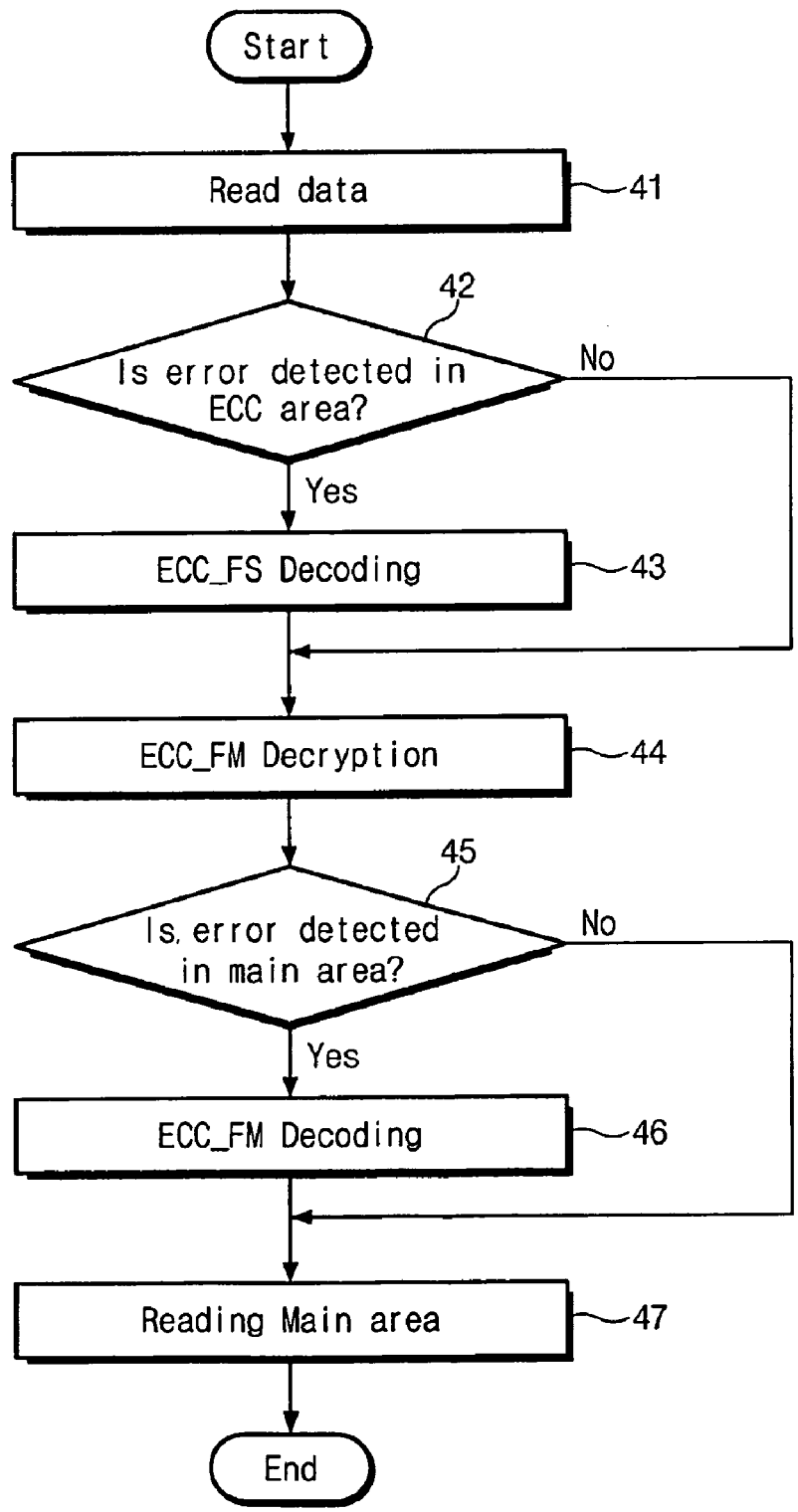
FIG. 4 is a flowchart illustrating a reading method for the flash memory system using the encryption method illustrated in FIG. 3.

FIG. 4 is a flowchart illustrating a reading method for the flash memory system using the encryption method illustrated in FIG. 3.

Referring to FIGS. 1 through 4, in step 41, the CPU 123 reads the data (the data in the main area, the encrypted Enc (ECC_FM) first ECC ECC_FM, and the second ECC ECC_FS) stored in the flash memory 130.

In step 42, the CPU 123 determines whether an error is detected in the encrypted Enc (ECC_FM) first ECC ECC_FM.

In step 43, if an error is detected from the encrypted Enc (ECC_FM) first ECC ECC_FM, the ECC circuit 124 decodes the second ECC ECC_FS. That is, the CPU 123 corrects the error in the encrypted Enc (ECC_FM) first ECC ECC_FM based on the second ECC ECC_FS.

In step 44, the Enc/Dec circuit 127 decrypts the encrypted Enc (ECC_FM) first ECC ECC_FM. In step 45, the CPU 123 determines whether an error is detected in the data in the main area.

In step 46, if an error is detected in the data in the main area, the ECC circuit 124 decodes the first ECC ECC_FM. That is, the CPU 123 corrects the error of the data in the main area based on the first ECC ECC_FM.

In step 47, the CPU 123 loads the data of the main area in the RAM 126. The flash memory system according to an exemplary embodiment of the present invention encrypts a portion (i.e., the ECC) of the data in the spare area, thereby improving the performance of the flash memory system and reducing overhead of hardware and software used for encryption/decryption of the flash memory system. Also, exposure of the boot code is prevented.

Also, in the flash memory system according to an exemplary embodiment of the present invention, when power is on, the boot code including the bit error and the encrypted ECC is loaded in the RAM to prevent the boot code from being hacked, thereby increasing the security level of integrated circuit cards including the flash memory system. Although exemplary embodiments of the present invention have been described for illustrative purposes, those skilled in the art will appreciate that various modifications, additions and substitutions are possible, without departing from the scope and spirit of the disclosure.

What is claimed is:

1. A storage system comprising:
 a storage for storing input data; and
 a storage controller controlling the storage, wherein the storage controller generates a first error correction code corresponding to the input data, encrypts the first error correction code, and generates a second error correction code corresponding to the encrypted first error correction code, and the storage includes a first area for storing the input data and a second area for storing the encrypted first error correction code, wherein the second error correction code is stored in the second area.

2. The storage system of claim 1, wherein the storage controller comprises:
 an encryption and decryption unit encrypting the first error correction code and decrypting the encrypted first error correction code; and
 an error correction code generation unit generating the first error correction code and the second error correction code.

3. The storage system of claim 1, wherein the storage controller encrypts the first error correction code using an externally transmitted key.

4. A storage system comprising:
 a storage for storing input data; and
 a storage controller controlling the storage, wherein the storage generates a first error correction code corresponding to the input data, encrypts the first error correction code, and generates a second error correction code corresponding to the encrypted first error correction code, and the storage includes a first area storing the input data and a second area for storing the encrypted firs error correction code, wherein the encrypted first error correction code, the second error correction code, and a flash translation layer are stored in the second area.

5. An encryption method of a storage including a storage for storing input data including a first area and a second area, the encryption method comprising:
 generating a first error correction code corresponding to input data;
 encrypting the first error correction code;
 generating a second error correction code corresponding to the encrypted first error correction code
 storing the input data in the first area of the storage, and storing the encrypted first error correction code in the second area of the storage;
 reading the input data, the encrypted first error correction code, and the second error correction code;
 detecting an error in the encrypted first error correction code based on the second error correction code;
 correcting the encrypted first error correction code when an error is detected in the encrypted first error correction code;
 decoding the second error correction code;
 decrypting the encrypted first error correction code;
 detecting an error in the input data based on the decrypted first error correction code;
 decoding the decrypted first error correction code when an error is detected in the input data; and
 correcting the error in the input data based on the first error correction code.

6. The encryption method of claim 5, wherein the input data is transmitted from an external host.

7. The encryption method of claim 5, wherein the encrypted first error correction code is generated using an externally transmitted key.

8. A storage system comprising:
 a storage for storing input data and including a first area and a second area, wherein the storage includes a control unit; and
 a storage controller controlling the storage, wherein the storage and the storage controller are housed in a single portable storage device, wherein the storage controller includes:

an error correction code generation unit generating a first error correction code, and an encryption/decryption unit for encrypting/decrypting the first error correction code;

wherein the storage controller stores the input data in the first area of the storage and stores an encrypted first error correction code in the second area, wherein the storage is formed of a plurality of pages each including a corresponding first area and a corresponding second area, each of the first areas including a first plurality of words and each of the second areas including a second plurality of words.

9. The storage system of claim 8, wherein the first plurality of words is 256 and the second plurality of words is 8.

10. The storage system of claim 9, wherein the first seven words of the second plurality of words are encrypted to form an encrypted area.

11. The storage system of claim 10, wherein the encrypted first error correction code is stored in the encrypted area.

12. The storage system of claim 11, wherein the encryption/decryption unit of the storage controller generates a second error correction code corresponding to the encrypted first error correction code.

13. The storage system of claim 12, wherein the second error correction code is stored in an eighth word of the second plurality of words.

* * * * *